United States Patent [19]

Mouri et al.

[11] Patent Number: 4,706,969
[45] Date of Patent: Nov. 17, 1987

[54] FLOATING RING DEVICE FOR SEALING SHAFT OF TURBO MACHINE

[75] Inventors: Yasushi Mouri; Kazuzo Katayama; Taku Ichiryu; Tsuneyoshi Mitsuhashi; Masanori Kobayashi, all of Takasago, Japan

[73] Assignee: Mitsubishi Yukogyo, Japan

[21] Appl. No.: 839,361

[22] Filed: Mar. 13, 1986

[30] Foreign Application Priority Data

Jul. 22, 1985 [JP] Japan .................. 60-160353

[51] Int. Cl.$^4$ .............................................. F16J 15/34
[52] U.S. Cl. ...................................... 277/83; 277/86; 277/177
[58] Field of Search ................ 277/83, 173, 176, 177, 277/86, 81 R, 82

[56] References Cited

U.S. PATENT DOCUMENTS

| 2,894,769 | 7/1959 | Richmond et al. ............... 277/83 X |
| 3,972,536 | 8/1976 | Warner et al. ........................ 277/83 |
| 4,432,555 | 2/1984 | Langley .............................. 277/83 X |

FOREIGN PATENT DOCUMENTS

| 643160 | 7/1962 | Italy ................................... 277/173 |
| 666348 | 6/1979 | U.S.S.R. .............................. 277/83 |
| 1043402 | 9/1983 | U.S.S.R. ............................ 277/173 |

Primary Examiner—Robert S. Ward
Attorney, Agent, or Firm—McGlew and Tuttle

[57] ABSTRACT

A device for sealing the shaft of a turbo machine in which there are disposed a shaft sealing side plate attached to a casing, an atmospheric side floating ring and an in-machine side floating ring arranged in a seal case and associated with the shaft with the interposition of a small space, the atmospheric side floating ring having an atmospheric side end surface in contact with the shaft sealing side plate, the in-machine side floating ring having an in-machine side end surface in contact with the seal case; the device being characterized in that a flexible ring which is deformable in compliance with the deformation of the atmospheric side floating ring during driving is interposed between the atmospheric side floating ring and the shaft sealing side plate, whereby an excessive load is not applied between each white metal of both the floating rings and a seal sleeve, hardening and scaling loss of the white metal are prevented, and the reliability of sealing in the turbo machine is improved.

2 Claims, 6 Drawing Figures

FLOATING RING DEVICE FOR SEALING SHAFT OF TURBO MACHINE

BACKGROUND OF THE INVENTION

(i) FIELD OF THE INVENTION

The present invention relates to a device for sealing the shaft of a turbo machine.

(ii) DESCRIPTION OF THE PRIOR ART

A conventional device for sealing the shaft of a turbo machine will be described in reference to FIGS. 3 and 4 attached hereto.

Reference numeral 1 is a shaft of a turbo machine, and numeral 2 is a casing of the turbo machine. A seal sleeve 3 is disposed along the shaft 1 in a fluid-tight state, and an atmospheric side floating ring 4 and an in-machine side floating ring 5 are disposed surrounding the seal sleeve 3, on the side of the atmosphere and inside the machine, respectively. Onto the inner peripheral surfaces of the atmospheric side floating ring 4 and the in-machine side floating ring 5, a white metal 6 is applied. Ring-like lugs 4a, 4b provided on the atmospheric side edge portion of the atmospheric side floating ring 4 are in contact with a shaft sealing side plate 7 attached to the casing 2 in a fluid tight state. The atmospheric side floating ring 4 is engaged with a dowel pin 8 provided on the shaft sealing side plate 7, and a coiled spring 9 is received in a spring seat which is composed of both openings formed in confronted surfaces of the atmospheric side floating ring 4 and the in-machine side floating ring 5. A dowel ring 10 inserted into the coiled spring 9 is planted in the atmospheric side floating 4. The in-machine side floating ring 5 is partially in contact with a seal case 11 attached fluidtightly to the casing 2 in the in-machine side portion of the case 11, and the casing 2 and the seal case 11 have oil feed openings 2a and 11a, respectively. On the atmospheric side of the shaft sealing side plate 7, a casing cover 12 attached fluid-tightly to the casing 2 is provided with a labyrinth 13 surrounding the shaft 1.

By means of a spring force of the coiled spring 9, the lugs 4a, 4b of the atmospheric side floating ring 4 are in contact with the shaft sealing side plate 7 and the inmachine side floating ring 5 is in contact with the inner surface of the in-machine side portion of the seal case 11. When the turbo machine is driven, a seal fluid having a specified pressure which is a little higher than a fluid pressure in the turbo machine to be sealed flows through the oil feed openings 2a and 11a in a direction shown by an arrow B in FIG. 3 and is then divided into two streams. One of these streams flows through a space between the seal sleeve 3 and the in-machine side floating ring 5 and returns to a seal fluid tank. At this time, the seal fluid serves to seal portions occupied by the fluid in the turbo machine and to lubricate the region between the white metal 6 of the in-machine side floating ring 5 and the seal sleeve 3. In this case, since the in-machine side floating ring 5 is pressed toward the inside of the machine, the seal case 11 is brought into contact with the in-machine side floating ring 5 at the contact portion thereof, as described above. However, even if a small space is present at the contact portion owing to, for example, a working error, the flowing seal fluid will seal the small space thereat.

The other of the two streams above flows through a space between the seal sleeve 3 and the white metal 6 of the atmospheric side floating ring 4 and through the space on an inside surface of the labyrinth 13 attached to the casing cover 12, and returns to a seal fluid tank. At this time, the seal fluid serves to lubricate the space between the white metal 6 and the seal sleeve 3 and to seal the space therebetween so as to prevent the atmosphere from penetrating in therethrough. The atmospheric side floating ring 4 is strongly pressed toward the atmospheric side and the lugs 4a, 4b are pressed against the shaft sealing side plate 7, as described above. However, even if a small space is present between the lugs 4a, 4b and the plate 7, the seal fluid will flow therethough in order to seal therebetween and to thereby prevent the atmosphere from coming in therethrough.

When the shaft 1 is deformed due to the change in a load condition or a vibration, the atmospheric side floating ring 4 slides on the shaft sealing side plate 7 with the interposition of the lugs 4a, 4b, and the in-machine side floating ring 5 slides on the contact portion with the seal case 11. Since the atmospheric side floating ring 4 is engaged with the shaft sealing side plate 7 with the aid of the dowel pin 8 and since the in-machine side floating ring 5 is connected to the atmospheric side floating ring 4 via the dowell 10, the shaft sealing side plate 7 does not follow the deformation of the shaft 1.

However, in the case of the device for sealing the shaft of the turbo machine shown in FIGS. 3 and 4, a pressure P of the seal liquid acts on the in-machine side surface of the shaft sealing side plate 7 and the outer peripheral surface of the atmospheric side floating ring 4, as shown in FIG. 5. In addition thereto, the atmospheric pressure also acts on the atmospheric side surface of the shaft sealing side plate 7, and an inclinedly distributed pressure acts on the surface of the white metal 6 of the atmospheric side floating ring 4. That is to say, the atmospheric pressure is applied onto the surface end portion on the atmospheric side of the white metal 6 of the atmospheric side floating ring 4, and the pressure P of the seal liquid is applied onto the surface end portion on the in-machine side of the same 6. Therefore, a bending mement (Mb) acts on the shaft sealing side plate 7, and the latter 7 bends in a direction of this moment Mb and the atmospheric side floating ring 4 bends in a direction of a momemt Ma under the influence of the moment Ma generated by the action of a pressure Po which is a differential pressure between both the above pressures on the surface of the white metal 6. As a result, the shaft sealing side plate 7 is brought into contact with the atmospheric side floating ring 4 via an outer edge portion of the lug 4a as shown in FIG. 6, with the result that a contact area diminishes remarkably and a contact pressure increases noticeably. In consequence, the slide of the atmospheric side floating ring 4 on the shaft sealing side plate 7 is obstructed, and thus the atmospheric side floating ring 4 cannot follow the deformation of the shaft 1..For this reason, a surface pressure between the white metal 6 and the seal sleeve 3 is increased excessively, whereby hardening and scalling loss take place on the white metal 6 and the seal sleeve 3.

SUMMARY OF THE INVENTION

Accordingly, an object of the present invention is to provide a device for sealing the shaft of a turbo machine in which any local contact is not present between a shaft sealing side plate and an atmospheric side floating ring, and the atmospheric side floating ring follows the deformation of a shaft, with the result that hardening and scalling loss between a white metal of the atmospheric side floating ring and a seal sleeve attached to the shaft can be prevented and the reliability of fluid sealing in the turbo machine can thus be improved.

In order to accomplish the above mentioned object, the present invention provides a device for sealing the shaft of a turbo machine in which there are disposed a shaft sealing side plate attached to a casing, an atmospheric side floating ring and an in-machine side floating ring arranged in a seal case and associated with the shaft with the interposition of a small space, the atmospheric side floating ring having an atmospheric side end surface in contact with the shaft sealing side plate, the in-machine side floating ring having an in-machine side end surface in contact with the seal case; the device being characterized in that a flexible ring which is deformable in compliance with the deformation of the atmospheric side floating ring during driving is interposed between the atmospheric side floating ring and the shaft sealing side plate.

According to the present invention thus constituted, a large diameter portion of the atmospheric side edge portion of the atmpheric side floating ring is deformed toward the atmospheric side by means of a seal fluid pressure in order to press the large diameter portion of the flexible ring, which is consequently deformed toward the atmospheric side. As a result, a uniform contact can be obtained between the in-machine side surface of the flexible ring and the atmospheric side edge portion of the atmospheric side floating ring, and a surface pressure therebetween is uniformly mitigated. Therefore, the slide movement of the atmospheric side floating ring on the flexible ring will be facilitated, and the atmospheric side floating ring will follow the deformation of the shaft, with the result that a surface pressure between the white metal and the seal sleeve will not become excessively large, and thus hardening and scalling loss will not occur.

Further, a difference between the pressures of front and back surfaces at in-machine side portions of the in-machine side floating ring and the seal case is small, and thus the in-machine side floating ring easily slides on the seal ring. In consequence, the in-machine side floating ring will follow the deformation of the shaft, and hardening and scalling loss will not take place on the white metal portion of the in-machine side floating ring. In short, the seal fluid effectively seals the small space between each of the atmospheric side floating ring and the in-machine side floating ring and the shaft.

DESCRIPTION OF THE PREFERRED EMBODIMENT

Figure 1:
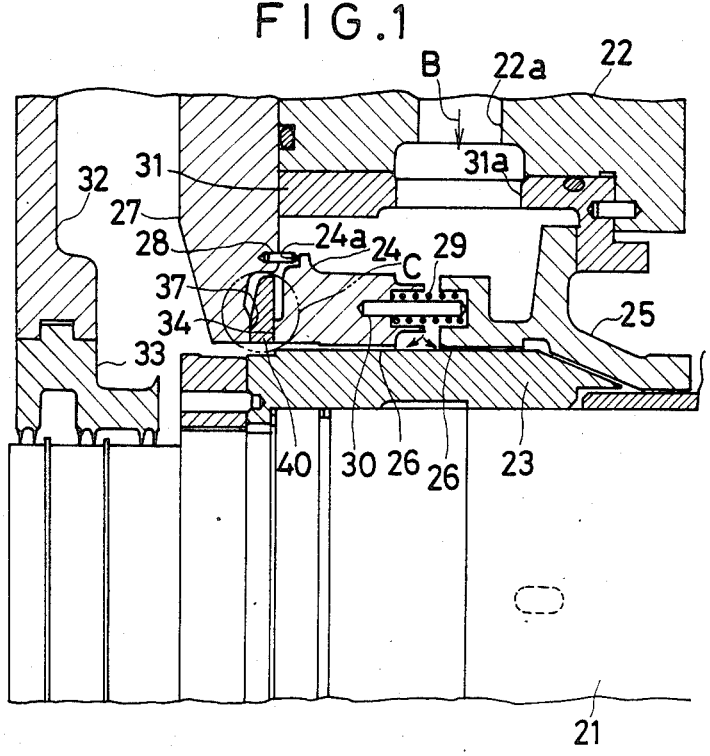
FIG. 1 is a vertically sectional view of a device for sealing the shaft of a turbo machine according to the present invention.
Figure 2:
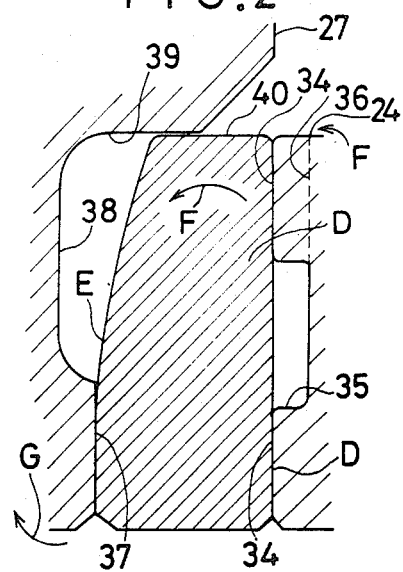
FIG. 2 is an enlarged vertically sectional view of a portion C in FIG. 1.

A device for sealing the shaft of a turbo machine according to the present invention will be described as one embodiment in reference to FIGS. 1 and 2.

Figure 3:
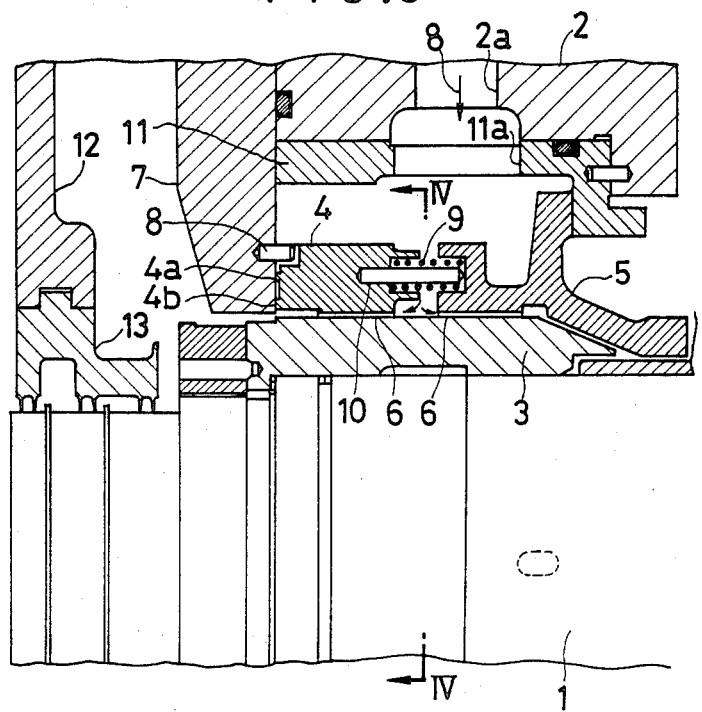
FIG. 3 is a vertically sectional view of a device for sealing the shaft of a conventional turbo machine.
Figure 4:
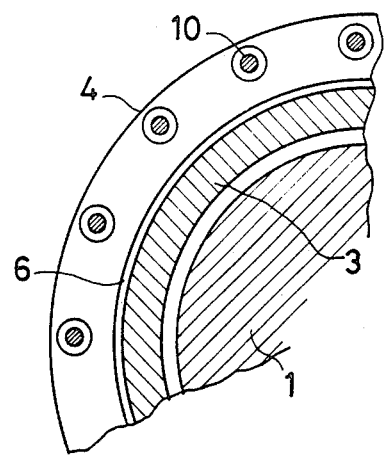
FIG. 4 is a sectional view taken along the line A—A in FIG. 3.

Reference numeral 21 is a shaft, numeral 22 is a casing, 22a is an oil feed opening, 23 is a seal sleeve, 25 is an in-machine floating ring, 26 is a white metal applied onto the inner peripheral surface of the in-machine side floating ring 25, 29 is a coiled spring, 30 is a dowel pin, 31 is a seal case, 31a is an oil feed opening, 32 is a casing cover, and 33 is a labyrinth. The members of these reference numerals correspond to those of the numerals 1, 2, 3, 5, 6, 9, 10, 11, 12 and 13 in FIG. 3.

The features of the present invention are as follows: An atmospheric side end surface 34 of an atmospheric side floating ring 24 is perpendicular to an axis of the shaft 21, and the end surface 34 is provided, in the middle thereof, with a ring-like groove 35, and is additionally provided, on the large diameter portion thereof, with a plurality of radial grooves 36. A white metal 26 is applied onto an inner peripheral surface of the atmospheric side floating ring 24. A small diameter portion 37 which is the in-machine side surface of a shaft sealing side plate 27 attached fluid-tightly to the casing 22 is perpendicular to the axis of the shaft 21, and a ring-like recess 38 is provided adjacent to the small diameter portion 37 and an outer end portion of this recess 38 is provided with a cylindrical surface 39. Further, a flexible ring 40 made from a synthetic resin is disposed between the shaft sealing side plate 27 and the atmospheric side floating ring 24, and inner and outer diameters of the flexible ring 40 are substantially equal to those of the atmospheric side floating ring 24. An in-machine side surface D of the flexible ring 40 is perpendicular to the axis of the shaft 21, and its atmospheric side surface E is formed in the shape of a convex-like curved surface expanding toward the atmospheric side. A dowel pin 28 is secured to the shaft sealing side plate 27 and is engaged with an engaging portion 24a of the atmospheric side floating ring.

When the turbo machine is driven, a seal fluid having a little higher specified pressure than a fluid in the machine flows in a direction of an arrow B through the oil feed opening 22a and 31a and is then divided into two streams. One of the two streams flows through the space between the in-machine floating ring 25 and the seal sleeve 23 and returns to a seal fluid tank. In this case, the seal fluid behaves as in the case of a shaft sealing device of a conventional turbo machine.

Figure 5:
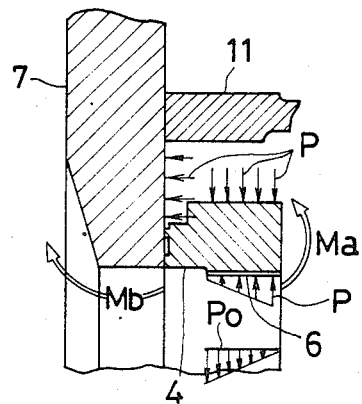
FIG. 5 is a sectional view showing an influence of a seal fluid on a shaft sealing side plate and an atmospheric side floating ring of a shaft sealing device for the conventional turbo machine.
Figure 6:
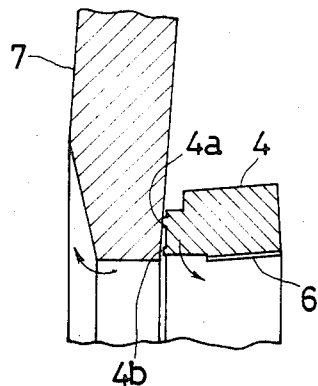
FIG. 6 is a sectional view showing a deformation state of the shaft sealing side plate and the atmospheric side floating ring of the shaft sealing device in the conventional turbo machine.

The other of the above two streams flows through the space between the seal sleeve 23 and the white metal 26 of the atmospheric side floating ring 24 and through the space between the small diameter portions of the flexible ring 40 and the shaft sealing side plate 27 toward the atmopheric side, and returns to the seal fluid tank through an inside portion of the labyrinth 33 of the casing cover 32. In this case, as elucidated in the description regarding FIG. 5, the end surface 34 of the atmospheric side floating ring 24 is deformed in the direction of an arrow F, so that the in-machine side surface D of the flexible ring 40 undergos a press force and in response to this force, the flexible ring 40 is deformed in the direction of the arrow F. On the other hand, the shaft sealing side plate 24 is also deformed in the direction of an arrow G as in the description of FIG. 5, but since the atmospheric side surface E of the flexible ring 40 is formed in the convex-like shape, a movement of the contact portion of the small diameter portion 37 of the shaft sealing side plate 27 and the atmospheric side surface E toward its large diameter portion is smaller than in the case that the side surface E is formed into a flat shape. Accordingly, the flexible ring 40 bends soothly and a uniform contact is maintained between the in-machine side surface D of the flexible ring 40 and the end surface 34 of the atmospheric floating ring 24. As a result, a surface pressure therebetween becomes uniformly low, the atmospheric side floating ring 24 easily slides on the flexible ring 40, and the surface pressure between the white metal 26 of the atmospheric floatig ring 24 and the seal sleeve 23 does not become excessively great, with the result that any hardening and scalling loss of the white metal does not take place.

Therefore, the seal fluid seals the portions occupied by the fluid and the atmosphere in the machine and lubricates the space between each of the white metal portions 26 and the seal sleeve 23. Further, the atmospheric side floating ring 24 is engaged with the shaft sealing side plate 27 with the interposition of the dowel pin 28, and the in-machine side floating ring 25 is engaged with the atmospheric side floating ring 24 via the dowel pin 30. In consequence, the shaft 21 rotates smoothly inside the white metal portions 26, 26 via the seal sleeve 23, so that the turbo machine drives in a smooth condition.

In the present invention, a flexible ring is interposed between the shaft sealing side plate and the atmospheric side end surface of the atmospheric side floating ring, and thus the surface pressure between the flexible ring and the atmospheric side floating ring can be lowered, so that the atmospheric side floating ring can easily slide on the flexible ring. Further, since the in-machine floating ring can also easily slide on the seal case at the contact portion thereof, an excessive load is not applied between the white metal sections of both the floating rings and the seal sleeve and the hardening and the scalling loss of the white metal can thus be prevented, whereby the reliability of sealing in the turbo machine can be improved.

The present invention has now been described in reference to the embodiment but is not to be limited to such an embodiment, and other modifications and variations of the present invention may be made without departing from the spirit and scope thereof.

What is claimed is:

1. A device for sealing the shaft of a turbo machine in which there are disposed a shaft sealing side plate attached to a casing, an atmospheric side floating ring and an in-machine side floating ring arranged in a seal case and associated with said shaft with the interposition of a small space, said atmospheric side floating ring having an atmospheric side end surface in contact with said shaft sealing side plate, said in-machine side floating ring having an in-machine side end surface in contact with said seal case; said device being characterized in that a flexible ring which is deformable in compliance with the deformation of said atmospheric side floating ring during driving is interposed between said atmospheric side floating ring and said shaft sealing side plate.

2. A device for sealing the shaft of a turbo machine according to claim 1 wherein inner and outer diameters of said flexible ring are substantially equal to those of said atmospheric side floating ring, an in-machine side surface of said flexible is perpendicular to an axis of said shaft, and an atmospheric side surface of said flexible ring is formed into the shape of a convex expanding toward its atmospheric side.

* * * * *